(12) United States Patent
Gordner

(10) Patent No.: US 11,358,674 B2
(45) Date of Patent: Jun. 14, 2022

(54) MOTORCYCLE HANDLEBAR FEATURING ACTIVE VIBRATION DAMPING

(71) Applicant: Bayerische Motoren Werke Aktiengesellschaft, Munich (DE)

(72) Inventor: Achim Gordner, Grossberghofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 16/572,748

(22) Filed: Sep. 17, 2019

(65) Prior Publication Data

US 2020/0023921 A1  Jan. 23, 2020

Related U.S. Application Data

(63) Continuation of application No. PCT/EP2018/061241, filed on May 3, 2018.

(30) Foreign Application Priority Data

Jun. 30, 2017  (DE) ...................... 10 2017 211 111.9

(51) Int. Cl.
   *B62K 21/12*   (2006.01)
   *F16F 15/02*   (2006.01)
   *F16F 15/00*   (2006.01)
   *F16F 15/023*  (2006.01)

(52) U.S. Cl.
   CPC ............ *B62K 21/12* (2013.01); *F16F 15/005* (2013.01); *F16F 15/023* (2013.01)

(58) Field of Classification Search
   CPC ........ F16F 15/02; F16F 15/023; F16F 15/027; F16F 15/0275; F16F 15/03; B62K 21/12; B62K 21/08
   See application file for complete search history.

(56) References Cited

U.S. PATENT DOCUMENTS

| | | | | |
|---|---|---|---|---|
| 5,005,678 A | * | 4/1991 | Julien | F16F 1/021 181/208 |
| 5,221,146 A | * | 6/1993 | Maruyama | F16C 25/06 384/447 |
| 5,802,184 A | * | 9/1998 | Heath | H03F 3/217 381/71.4 |

(Continued)

FOREIGN PATENT DOCUMENTS

| DE | 31 24 349 A1 | 7/1982 | | |
|---|---|---|---|---|
| DE | 3939822 A1 | * | 6/1991 | ............. B60G 13/16 |

(Continued)

OTHER PUBLICATIONS

EPO translation, DE 3939822 A1. (Year: 1991).*

(Continued)

*Primary Examiner* — Thomas J Williams
(74) *Attorney, Agent, or Firm* — Crowell & Moring LLP

(57) ABSTRACT

A handlebar for a motor vehicle, in particular a motorcycle or a motorcycle-type vehicle, has a vibration damping mechanism designed to dampen a first vibration of the handlebar. The vibration damping mechanism is designed to detect the first vibration and is equipped with at least one actuator which is effectively coupled to the handlebar in a vibration-transmitting manner and which, in response to the detected first vibration, can be actuated to introduce a second vibration into the handlebar.

9 Claims, 1 Drawing Sheet

(56) References Cited

U.S. PATENT DOCUMENTS

| | | | | |
|---|---|---|---|---|
| 2002/0046564 A1* | 4/2002 | Rastegar | ............... | B25J 9/1638 |
| | | | | 60/476 |
| 2005/0257978 A1 | 11/2005 | Sigfrid | | |
| 2005/0284713 A1* | 12/2005 | Fischer | ................. | F16F 15/02 |
| | | | | 188/266.7 |
| 2007/0212939 A1* | 9/2007 | Melz | ...................... | F16F 15/00 |
| | | | | 439/589 |
| 2009/0255365 A1 | 10/2009 | Bunne | | |
| 2016/0248361 A1* | 8/2016 | Elenga | .................. | H02K 33/16 |
| 2016/0377649 A1* | 12/2016 | Rytkonen | ................ | G01P 15/18 |
| | | | | 73/514.32 |

FOREIGN PATENT DOCUMENTS

| | | | | |
|---|---|---|---|---|
| DE | 10316946 A1 * | 10/2004 | ............ | F15B 21/008 |
| DE | 10 2005 047 144 A1 | 4/2007 | | |
| DE | 10 2011 079 869 A1 | 1/2013 | | |
| DE | 10 2012 204 599 A1 | 9/2013 | | |
| EP | 3597520 A1 * | 1/2020 | ............. | B62K 21/12 |
| GB | 2 080 920 A | 2/1982 | | |
| WO | WO 2013/139532 A2 | 9/2013 | | |

OTHER PUBLICATIONS

International Search Report (PCT/ISA/210) issued in PCT Application No. PCT/EP2018/061241 dated Jul. 27, 2018 with English translation (four (4) pages).

German-language Written Opinion (PCT/ISA/237) issued in PCT Application No. PCT/EP2018/061241 dated Jul. 27, 2018 (five (5) pages).

German-language Search Report issued in counterpart German Application No. 102017211111.9 dated Aug. 1, 2018 with partial English translation (13 pages).

Quitter, "Schwingungstilger—Aktive und passive Tilger zur Schwingungsreduktion", Konstruktions Parxis, Jan. 20, 2012, (six (6) pages).

Chinese-language Office Action issued in Chinese Application No. 201880020149.2 dated May 27, 2020 with English translation (11 pages).

\* cited by examiner

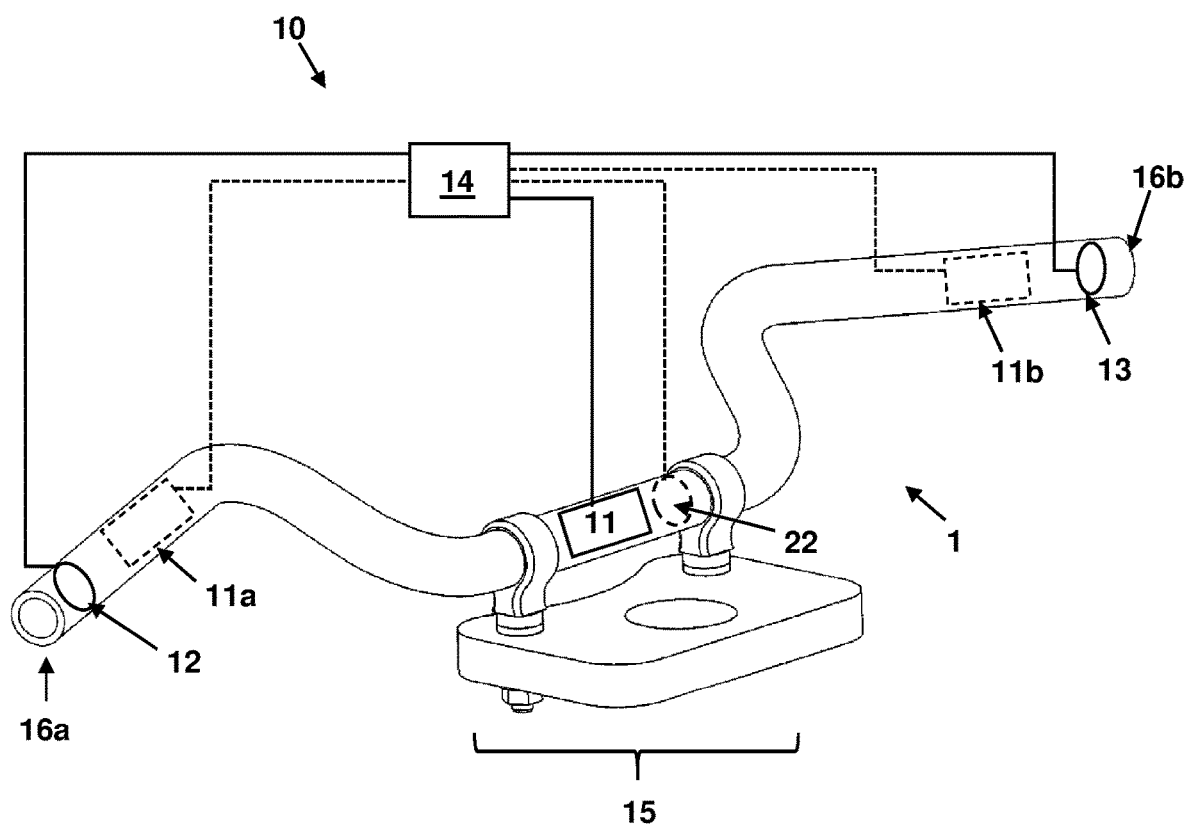

MOTORCYCLE HANDLEBAR FEATURING ACTIVE VIBRATION DAMPING

CROSS REFERENCE TO RELATED APPLICATIONS

This application is a continuation of PCT International Application No. PCT/EP2018/061241, filed May 3, 2018, which claims priority under 35 U.S.C. § 119 from German Patent Application No. 10 2017 211 111.9, filed Jun. 30, 2017, the entire disclosures of which are herein expressly incorporated by reference.

BACKGROUND AND SUMMARY OF THE INVENTION

The invention relates to a handlebar for a motor vehicle, in particular for a motorcycle or a motorcycle-type vehicle, with a vibration damping mechanism for damping a vibration of the handlebar. The invention also relates to a motor vehicle equipped with such a handlebar.

During the operation of a vehicle, oscillations or vibrations of different frequencies usually occur, caused for example by a drive engine of the vehicle, the gearbox thereof or the road. The oscillations or vibrations are transferred to individual components or to the entire vehicle. Especially in the region of so-called natural frequencies, these vibrations are noticeable to a user to a greater and, particularly, disturbing extent.

Especially in motorcycles or motorcycle-type vehicles, the vibrations are transmitted directly to the driver via the handlebar fork and the handlebar grips. The vibrations are therefore immediately noticeable to the driver and can significantly impair driving comfort. During longer journeys, the vibrations can even lead to numbness in the fingers and hands.

From the state of the art, various measures to reduce these oscillations or vibrations are known. For example, for the attenuation of the vibrations, handlebar weights are installed at the ends of the motorcycle handlebar that are intended to change the natural frequency of the handlebar and thus avoid stimulation by vibrations of this frequency. However, since the handlebar weights only shift the natural frequency, only a small proportion of the broadband frequencies arriving at the handlebar are attenuated. The remaining proportion remains distinctly noticeable to the driver.

Alternative devices provide vibration reduction using loose material, such as lead granulate, which is provided in a cavity inside the grips. This is set into natural motion by the acting vibrations and thus dampens the occurring vibrations. Such a device is described, for example, in US 2005/0257978 A1.

The use of vibrating masses that are mounted inside the handlebar grip and that are themselves set vibrating by the occurring vibrations is another possibility for the reduction of vibrations.

With the help of said devices, therefore, only partially effective attenuation (or only attenuation that is effective in a certain frequency range) can be provided. As a result, it is not possible to provide consistent vibration comfort on the handlebar with these devices that can be created over the widest possible range of driving speeds and under different road conditions.

Another device is described, for example, in DE 10 2011 079 869 A1.

It is therefore an object of the invention to provide an improved vibration damping mechanism, in particular to provide a vibration damping mechanism that provides a damping effect over the widest possible frequency spectrum.

This object is achieved with a handlebar comprising a vibration damping mechanism according to the claimed invention, and with a motor vehicle according to the claimed invention.

Accordingly, a handlebar for a motor vehicle, in particular a motorcycle or a motorcycle-type vehicle, is provided with a vibration damping mechanism that is designed to damp a first vibration of the handlebar. For this purpose, the vibration damping mechanism is embodied to detect the first oscillation and comprises at least one actuator coupled to the handlebar for oscillation transmission, which is actuated in response to the detected first oscillation for the introduction of a second oscillation into the handlebar.

Thus, a handlebar is provided which has an active oscillation control system, which provides increased comfort for the driver by introducing the second oscillation into the handlebar. For this purpose, the first oscillation, i.e. the disturbing oscillatory movement of the handlebar, must first be detected and the one actuator or the plurality of actuators must be actuated in response. The actuator(s) is/are connected to the (oscillating) handlebar to stimulate the handlebar with the second oscillation.

Effective coupling between the at least one actuator and the handlebar can be carried out owing to the fact that the respective actuator is disposed either within the handlebar, i.e. for example in a cavity formed by the handlebar. Alternatively, the at least one actuator can be disposed outside the handlebar and connected to the handlebar so as to transmit oscillations thereto.

The second oscillation can be designed in such a way that it at least partially superimposes on the first oscillation. The superimposition can be tuned in such a way that at least partial extinction of the first oscillation is carried out by the generated second vibration in order to reduce the resultant oscillation of the handlebar as well as the transmission to the driver and thus to increase comfort.

According to one embodiment, the second oscillation generated by the at least one actuator in the actuated state has the same frequency as the first oscillation as well as a related phase shift of substantially $\varphi=180°$. This means that the second oscillation is essentially generated with opposite phase to the first oscillation in order to achieve at least partial extinction of the first oscillation. Thus, an actively controlled vibration damping mechanism is provided, which is not only designed for a specific (natural) frequency of the handlebar but can be varied and is therefore optimally usable for a wide frequency range. This makes it particularly effective to reduce or dampen the first oscillation.

Furthermore, the second oscillation may have an essentially equal amplitude to the first oscillation. In this case, an essentially complete superimposition and cancellation of the first oscillation can be achieved by use of the second oscillation acting as a counter-oscillation. In other words, in this way, extinction of both oscillations is achieved by destructive interference. A resulting oscillatory movement of the handlebar can be avoided in this way, so that the handlebar are as vibration-free as possible.

For example, the vibration attenuation device may include at least one sensor for detecting the first oscillation and generating a signal in response to the detected first oscillation.

The at least one sensor may be formed as an accelerometer in each case, in particular for detecting a frequency and/or an amplitude of the first oscillation in at least one spatial direction, preferably in all three spatial directions.

These embodiments allow for the most accurate possible detection of the first oscillation acting on the handlebar. This is the prerequisite for the most precise tuning of the second oscillation generated by the actuator in order to superimpose on the first vibration. For example, an accelerometer can be disposed centrally, i.e. in a middle section of the handlebar. Alternatively or additionally, a (further) accelerometer can be disposed in the region of the handlebar grips.

Also, the vibration attenuation device can comprise a control unit that is embodied to receive the signal generated by at least one sensor and to control the at least one actuator in response to the signal received from the at least one sensor. Thus, it can be made possible to process the signal received from the one or more sensor(s) in each case by instructions placed in the control unit, for example by way of a control algorithm, and to control the one actuator or the plurality of actuators in response. During the processing, for example, an inversion of the received signal can be carried out for generating the phase offset and a respective control signal can be transmitted to the at least one actuator. Of course, in the case of a plurality of actuators, each actuator can receive either a common signal for all actuators or an individual signal for each actuator. The individual signals can differ in particular with regard to frequency, amplitude and/or phase shift of the respective second signal to be generated by the corresponding actuator. The control can be carried out by way of analog control electronics, but also by a microprocessor-controlled unit with a corresponding algorithm and/or adapted mathematical models. A learning algorithm is also possible with a correspondingly implemented sensor system.

Furthermore, the at least one actuator may be assigned to a middle section of the handlebar or a handlebar end, or each actuator may be assigned to a respective handlebar end of the handlebar. The central arrangement is useful, for example, if a particularly light and compact form of design is required. On the other hand, the assignment of a first actuator to a first end of the handlebar and the assignment of a second actuator to a second end of the handlebar allows a particularly effective oscillation superimposition. In each case, if multiple actuators are used, these can be controlled separately from each other, for example in terms of frequency, amplitude, phase shift and/or time.

Furthermore, the at least one actuator may each include a rotating flywheel mass with an imbalance or may be embodied as a hydraulic, pneumatic, electric or piezoelectric actuator.

In addition, a motor vehicle, in particular a motorcycle or a motorcycle-type vehicle, is provided with a handlebar for steering that is embodied in accordance with this description.

In particular, two-wheeled, three-wheeled or four-wheeled motor scooters, scooters, trikes or quads are to be understood as motorcycle-type vehicles.

Thus, a handlebar is provided that comprises an active vibration control system and offers the driver increased comfort in that: disturbing oscillations or vibrations (caused, for example, by road stimulation, an internal combustion engine or the drive) are cancelled by means of a targeted counter-vibration—the second oscillation. With the help of the active vibration damping mechanism, the second oscillation can be individually adapted to the first oscillation, so that optimal adaptation to different frequencies is possible, which would not be possible by means of passive systems, which are only designed for a specific natural frequency and only shift said natural frequencies.

Due to the resulting compact and lightweight design, heavy passive masses, such as handlebar weights, can be avoided, whereby it is made possible to improve the mass inertia of the entire handlebar and to speed up steering movements.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a perspective view of a handlebar for a motor vehicle.

DETAILED DESCRIPTION OF THE DRAWINGS

FIG. 1 shows a handlebar 1 for a motor vehicle in a perspective view. The motor vehicle may, in particular, be a motorcycle or a motorcycle-type vehicle. The handlebar 1 comprises a single schematically indicated vibration damping mechanism 10, which is designed for damping a first oscillation of the handlebar 1. For this purpose, the vibration damping mechanism 10 is embodied for detecting the first oscillation and comprises an actuator 11 that is capable of being operated in response to the detected first oscillation to introduce a second oscillation into the handlebar 1. For example, the second oscillation generated by the actuator in the actuated state may have the same frequency as the first oscillation as well as a relative phase shift of essentially $\varphi=180°$. In addition, the second oscillation may have an amplitude of the same size as the first oscillation. In this way a cancellation is carried out by a destructive interference of both oscillation.

To detect the first oscillation, the vibration damping mechanism 10 in the embodiment shown comprises two sensors 12, 13. These sensors are also embodied to generate a signal in response to the detected first oscillation. For example, accelerometers can be used as sensors 12, 13 to determine a frequency and/or an amplitude of the first oscillation in at least one spatial direction. Detection in all three spatial directions is particularly suitable for the best possible damping result. In the embodiment presented, the two sensors 12, 13 are assigned to a respective handlebar end 16a, 16b. Alternatively or additionally, a (further) sensor 22 may also be arranged in a middle section 15 of the handlebar.

In order to receive and process the signals generated by the sensors 12, 13, 22, the vibration damping mechanism 10 also includes a control unit 14 that is operatively coupled to the sensors 12, 13, 22. In response to the signals received by the sensors 12, 13, 22, the control unit 14 generates a signal for controlling the actuator 11.

The actuator 11 is disposed in the middle section 15 of the handlebar 1 according to the embodiment shown. Alternatively or additionally, it is also possible to dispose the actuator 11 in an area between the middle section 15 and the handlebar end 16a, 16b, or to dispose the single actuator 11 in the region of one of the two handlebar ends 16a, 16b. It is also possible to assign a separate (further) actuator 11a, 11b to each one of the handlebar ends 16a, 16b (shown dotted).

In any case, each of the actuators 11, 11a, 11b may comprise a rotating flywheel mass with an imbalance or may be embodied as a hydraulic, pneumatic, electric or piezoelectric actuator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A handlebar for a motor vehicle, comprising:
a vibration damping mechanism configured to damp a first oscillation of the handlebar,
wherein
the vibration damping mechanism includes
a multi-axis accelerometer in an outer region of the handlebar away from a middle region of the handlebar, the multi-axis accelerometer being configured to detect the first oscillation, and
at least one actuator located in the middle region of the handlebar, the at least one actuator being actively coupled to the handlebar so as to transmit oscillations,
the at least one actuator is actuatable in response to the detected first oscillation to introduce a second oscillation into the handlebar corresponding to the first oscillation which is at least partially superimposed on the first oscillation to cause at least partial extinction of the first oscillation by the second oscillation, and
the multi-axis accelerometer is a three-axis sensor configured for detecting a frequency and/or an amplitude of the first oscillation in three orthogonal spatial directions.

2. The handlebar according to claim 1, wherein the motor vehicle is a motorcycle-type of motor vehicle.

3. The handlebar according to claim 1, wherein the second oscillation generated by the at least one actuator in the actuated state has a same frequency as the first oscillation as well as a phase shift of essentially $\varphi=180°$.

4. The handlebar according to claim 3, wherein the second oscillation has an essentially equal amplitude to the first oscillation.

5. The handlebar according to claim 1, wherein the vibration damping mechanism comprises at least one sensor for detecting the first oscillation and generating a signal in response to the first oscillation.

6. The handlebar according to claim 5, wherein the vibration damping mechanism comprises a control unit that is configured to receive the signal generated by the at least one sensor as well as for controlling the at least one actuator in response to the received signal.

7. The handlebar according to claim 1, wherein the at least one actuator comprises a rotating flywheel mass with an imbalance or is configured as a hydraulic, pneumatic, electric or piezoelectric actuator.

8. A motor vehicle, comprising:
a handlebar for steering; and
a vibration damping mechanism configured to damp a first oscillation of the handlebar,
wherein
the vibration damping mechanism includes
a multi-axis accelerometer in an outer region of the handlebar away from a middle region of the handlebar, the multi-axis accelerometer being configured to detect the first oscillation, and
at least one actuator located in the middle region of the handlebar, the at least one actuator being actively coupled actively coupled to the handlebar so as to transmit oscillations,
the at least one actuator is actuatable in response to the detected first oscillation to introduce a second oscillation into the handlebar corresponding to the first oscillation which is at least partially superimposed on the first oscillation to cause at least partial extinction of the first oscillation by the second oscillation, and
the multi-axis accelerometer is a three-axis sensor configured for detecting a frequency and/or an amplitude of the first oscillation in three spatial directions.

9. The motor vehicle according to claim 8, wherein the motor vehicle is a motorcycle-type of motor vehicle.

* * * * *